Figure 1:
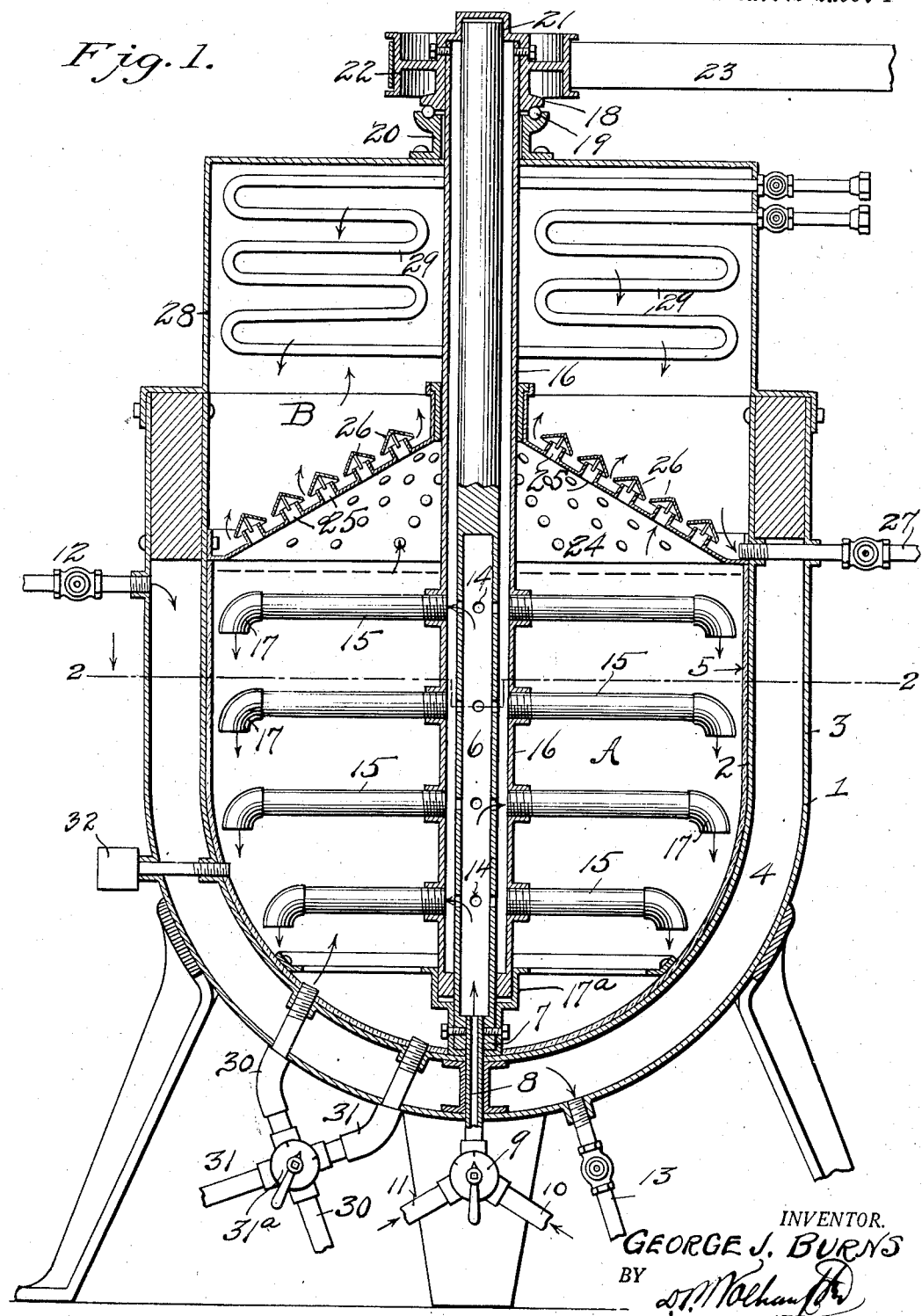

Feb. 24, 1925.

G. J. BURNS

OIL STILL

Filed Dec. 9, 1921 2 Sheets-Sheet 1

1,527,836

INVENTOR.
GEORGE J. BURNS
BY
ATTORNEY

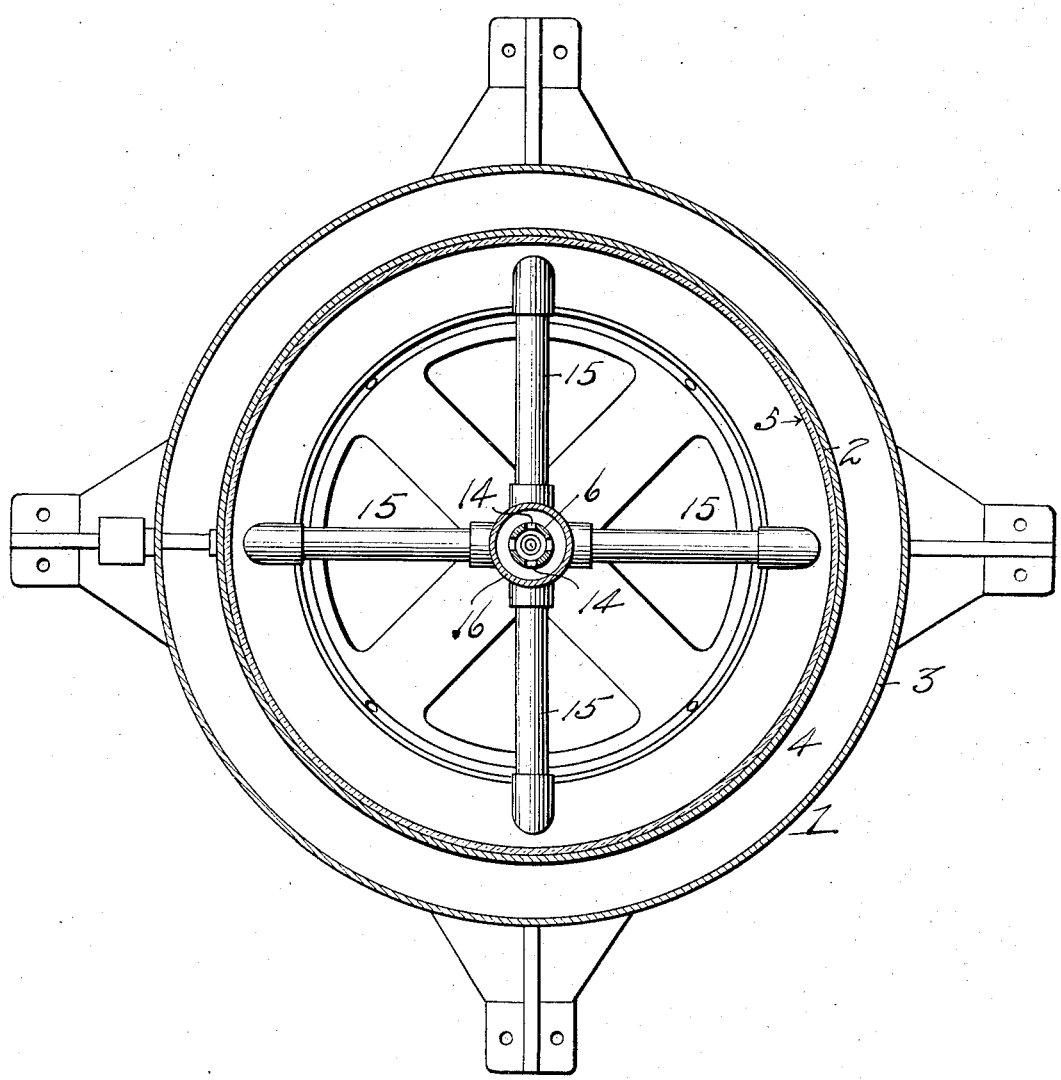

Patented Feb. 24, 1925.

1,527,836

UNITED STATES PATENT OFFICE.

GEORGE J. BURNS, OF YOUNGSTOWN, OHIO.

OIL STILL.

Application filed December 9, 1921. Serial No. 521,191.

*To all whom it may concern:*

Be it known that I, GEORGE J. BURNS, a citizen of the United States, residing at Youngstown, in the county of Mahoning and State of Ohio, have invented certain new and useful Improvements in Oil Stills, of which the following is a specification.

This invention relates to a new type still primarily designed for obtaining a new oil product for use as a motor-fuel or as a lubricant.

To that end the invention chiefly has in view a form of apparatus possessing means for obtaining a thorough mixture of the base substances from which the distillate is taken, including means for incorporating the necessary chemicals therewith during the process of heating, as well as to provide new and practical means for refrigerating the gases to produce the final distillate without interference with the heating and mixing steps which are contemporaneously carried along with the refrigerating or condensing step.

With these and other objects in view which will more readily appear as the nature of the invention is better understood, the same consists in the novel construction, combination and arrangement of parts hereinafter more fully described, illustrated and claimed.

The essential features of the invention are necessarily susceptible of structural modification without departing from the spirit or scope thereof, but one practical embodiment of the apparatus or still is shown in the accompanying drawings in which Figure 1 is a vertical longitudinal sectional view of the complete still, showing the relation of the various instrumentalities comprising the heating and mixing part of the apparatus and the refrigerating or condensing chamber which is in communication therewith through protected outlets.

Figure 2 is a horizontal or cross sectional view through the apparatus on the line 2—2 of Figure 1.

Like reference numerals designate corresponding parts.

Primarily the apparatus includes in its general organization a mixing and gasifying chamber designated by the letter A and a condensing chamber designated by the letter B. These two chambers are enclosed in a suitable form of construction and respectively provide, with their associated equipment, for mixing and gasifying the base substances from which the distillate is to be taken, and for condensing the gaseous product resulting from the heating step into liquid form ready for use.

The mixing and gasifying chamber A is confined within a heating vessel of suitable form. A practical construction for the heating vessel is shown in the accompanying drawings as consisting of a semispherical drum designated generally by the numeral 1 and preferably of a jacketed type, having the inner and outer spaced walls 2 and 3 confining therebetween an intervening steam space 4, and it is also preferable, in carrying forward this invention, to provide the inner wall of the vessel with a vitreous or equivalent protective lining 5 which serves to protect the vessel from corroding influences and also to prevent contamination of the substances and materials being treated by contact with metal surfaces. However, this is a detail that may be omitted without affecting the invention.

Within the heating vessel is arranged a centrally disposed feed pipe 6 suitably fitted at its lower end as at 7 on the bottom of the heating vessel 1, and having its upper portion extending above the condensing chamber B. The said feed pipe may be of a solid or closed form above the plane of the heating vessel 1, as indicated from the drawings, inasmuch as only that part of the said pipe which lies within the heating vessel is utilized as a hollow feeding member for supplying steam and chemicals into and throughout the mixing and gasifying chamber A from the center thereof. Accordingly the said feed pipe, or at least the hollow part thereof, has associated therewith means for receiving steam and also chemical solutions, and means for discharging the latter into the substances within the heating vessel. To that end there may be conveniently fitted to the bottom portion of the heating vessel 1 a feeding nipple 8, in communication at one end with the lower end of the feed pipe 6 and at its lower end having valved connection 9 respectively with a pipe 10 leading from a source of steam supply and with a pipe 11 leading from a source of chemical supply. Also the vessel may be fitted at suitable points with steam inlet and outlet connections 12 and 13 to thereby supply the steam space 4 with steam for heating the vessel.

In addition to the means for applying steam or chemicals to the central feed pipe 6 the latter is provided at a plurality of elevations with a series of discharging holes 14 through which the steam or chemicals are discharged in an outward direction. Each series of the holes 14 comprises a number of holes or openings arranged in a circle in the same horizontal plane in order that the steam or liquid discharging therefrom may jet into the inner open ends of tubular agitator arms 15 also arranged in the same horizontal plane as the said holes 14 and carried by a revolving agitator carrier 16. Therefore it will be understood that for each circular series of the discharging holes 14 there are a plurality of horizontally arranged agitator arms which are fitted to and revolved with a revolving carrier 16. Any number of the agitator arms 15 may be employed in each set thereof, at the different elevations in the heating vessel, and the same are preferably of a length to extend outward from the supporting carrier 16 to points within reasonable proximity to the inner wall of the heating vessel 1 and at their outer ends are preferably provided with or have fitted thereto the downturned delivery nozzles 17 which serve to direct the steam or liquid downward into the mass within the vessel. It will be seen that the inner open ends of the arms 15 are always exposed to the series of discharging holes 14 in the same horizontal plane, so there will be practically a continuous discharge of steam or liquid from the central feed pipe 6 into the agitator arms as they are rotated within the vessel by the revolving carrier 16.

The revolving carrier 16 may be constructed in any suitable manner and rotated or revolved by any convenient power connection therewith. However in the illustrated embodiment the said carrier 16 may consist of a revolving sleeve shaft coaxial with the feed pipe 6 and its upper extension and revolving freely thereover. The lower end of the said sleeve shaft is preferably held and guided in a suitable step bearing 17ª fitted to the same, and the upper end of the said sleeve shaft, above the apparatus may be fitted with a bearing block 18 having a ball bearing or equivalent mounting 19 upon a bearing support 20 and also having a free bearing 21 upon the upper part of the central feed pipe. Also the upper exposed part of the sleeve shaft 16 which constitutes the revolving agitator carrier may have fitted thereto a pulley 22 to receive a suitably operated driving belt 23.

The top of the heating vessel 1 is closed by a cover plate designated as 24. This cover plate preferably is of a conical form to present inclining walls for directing the liquid of condensation to the point of discharge. Also it will be observed that the said cover plate constitutes the partition between the mixing and gasifying chamber A and the condensing chamber B, and said cover plate is provided with a multiplicity of discharge openings 25 capped or masked within the condensing chamber by hoods or umbrellas 26 arranged at the condensing chamber side of the cover plate so that falling liquid cannot pass back into the mixing and gasifying chamber but will be deflected by the outside of the cover plate to the drawoff pipe or pipes 27 in communication at their inner ends with the lowest point of the cover plate.

The condensing chamber 26 is enclosed within a suitable casing 28 and within this casing are mounted any suitable or predetermined number of cooling or refrigerating coils 29 which are supplied by the well-known means with ammonia or other refrigerant.

The heating vessel 1 may be fitted at any convenient point with a valved oil supply tube or pipe 30 through which the crude petroleum is introduced into the vessel and through a separate supply pipe 31, or in any other convenient way, animal or vegetable fat may be supplied to the vessel. As shown, a common valve 31ª may control both pipes 30 and 31.

Of course these supply pipes may be used for introducing any substance that may be desired to be treated within the still, but a preferable use of the invention is to mix crude petroleum and animal fat within the feeding vessel, and through the medium of the steam jacket to gasify the mixture, at the same time causing the resulting gas or vapor to pass through the hooded outlets 25 in the cover plate 24 and strike the refrigerated atmosphere in the condensing chamber B, thereby causing the gas or vapor to condense into liquid form, collect on the cover plate 24 and drain off through the drawoff pipe or pipes 27.

During the operation of the machine the steam is also preferably utilized to facilitate the proper mixing together of the crude petroleum and the animal fat, and to that end it is discharged from the central feed pipe 6 and through the agitator arms 15 into the mixture. The steam also assists in causing an intimate admixture of the acid removing agent which may be introduced at the desired time, and for this purpose a solution from wood ashes may be employed. It will therefore be understood that primarily the invention is intended to provide a means for producing a non-acid oil product for use as a motor-fuel or as a lubricant and to that end provides a means for thoroughly mixing together crude petroleum oil and a fat, such as an animal fat, and introducing steam and an acid removing or neutralizing agent such as a solution obtained by leaching wood ashes with water and agitating the whole together while subjecting the mass to sufficient heat to gasify the same, producing vapors which rise into the condensing chamber and are liquefied therein, as above explained.

The important parts of the invention have been referred to, but of course it will be understood that various accessories may be employed with the same such for instance as any suitable heat indicating device, designated generally by the reference number 32, and changes may be made in the form and minor details of the construction without departing from the spirit or scope of the invention. It will therefore be understood that modifications or changes may be resorted to to any extent as may fall within the scope of the appended claims.

I claim:

1. An apparatus of the class described including a double walled retort, a substantially conical cover plate fitting within the inner wall and provided with hooded discharge openings, a cover for the retort and cooperating with said cover plate to provide a condensing chamber, a condensing coil in said chamber, a draw-off pipe communicating with the condensing chamber, a hollow standard journaled in the cover and in the bottom wall of the retort, and carrying a plurality of hollow offset agitating arms, and a perforated stem pipe for conducting steam to said hollow standard.

2. An apparatus of the class described including a double walled retort having a rounded bottom, a conical cover plate fitting within the inner wall of the retort and having a plurality of hooded openings, a cover for the top of the retort and cooperating with the said cover plate to provide a condensing chamber, a cooling coil in said chamber, a hollow standard constituting a revolving carrier respectively journaled in the cover and the bottom wall of the retort, a plurality of radially offset arms carried by said standard, said arms having downwardly discharging elbows at their outer ends, a pipe centrally disposed within the hollow standard forming the revolving carrier and having lateral perforations discharging into the radially offset hollow arms carried by the standard, and a valved pipe line communicating with said centrally disposed pipe, and a draw-off connection communicating with the condensing chamber at the bottom of the conical cover plate.

In testimony whereof I hereunto affix my signature in the presence of two witnesses.

GEORGE J. BURNS.

Witnesses:
EMORY L. GROFF,
VIRGINIA L. WATSON.